United States Patent
Huang et al.

(10) Patent No.: US 12,087,093 B2
(45) Date of Patent: Sep. 10, 2024

(54) ELECTRONIC DEVICE AND A RELATED METHOD FOR DETECTING AND COUNTING AN ACTION

(71) Applicant: Sony Group Corporation, Tokyo (JP)

(72) Inventors: Sangxia Huang, Lund (SE); David Strömbäck, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 450 days.

(21) Appl. No.: 17/349,853

(22) Filed: Jun. 16, 2021

(65) Prior Publication Data
US 2022/0019778 A1 Jan. 20, 2022

(30) Foreign Application Priority Data
Jul. 17, 2020 (SE) .................................. 2050907-1

(51) Int. Cl.
*G06V 40/20* (2022.01)
*A63B 24/00* (2006.01)
(Continued)

(52) U.S. Cl.
CPC .......... *G06V 40/20* (2022.01); *A63B 24/0062* (2013.01); *G06F 18/21* (2023.01);
(Continued)

(58) Field of Classification Search
None
See application file for complete search history.

(56) References Cited

U.S. PATENT DOCUMENTS 10,872,149 B1 12/2020 Alexander
2009/0109290 A1* 4/2009 Ye .................. G09G 3/3611
348/155

(Continued)

FOREIGN PATENT DOCUMENTS

| CN | 110457995 A | 11/2019 |
| CN | 110490064 A | 11/2019 |
| EP | 3243557 A1 | 11/2017 |

OTHER PUBLICATIONS

Toshikazu Wada et al.: Multiobject Behavior Recognition by Event Driven Selective Attention Method; IEEE Transactions on Pattern Analysis and Machine Intelligence, IEEE Computer Society, vol. 22, No. 8, dated Aug. 2000; pp. 873-887.

(Continued)

*Primary Examiner* — Randolph I Chu
(74) *Attorney, Agent, or Firm* — Tucker Ellis LLP (57) ABSTRACT

An electronic device includes memory circuitry, and processor circuitry having an action detection circuitry configured to operate according to an action detection model for detecting an action based on a machine-learning scheme. The processor circuitry being configured to obtain sensor data; generate, based on the sensor data, a set of features associated with a frame; determine, based on the set, using the action detection model, whether the frame corresponds to a sub-action; apply a nondeterministic finite automaton, NFA, scheme, to the determined sub-action for the frame, wherein the NFA scheme has a set of states associated with corresponding sub-actions and is configured to output one or more action classes; determine, using the NFA scheme, an action class; detect the action based on the action class; and increment an action counter based on the detected action.

22 Claims, 6 Drawing Sheets

(51) Int. Cl.
  *G06F 18/21* (2023.01)
  *G06F 18/24* (2023.01)
  *G06N 20/00* (2019.01)

(52) U.S. Cl.
  CPC ............. *G06F 18/24* (2023.01); *G06N 20/00* (2019.01); *A63B 2220/05* (2013.01); *A63B 2220/17* (2013.01)

(56) References Cited

U.S. PATENT DOCUMENTS

| | | | |
|---|---|---|---|
| 2011/0044492 A1* | 2/2011 | Cobb | G06V 20/52 382/100 |
| 2011/0206273 A1* | 8/2011 | Plagemann | G06T 17/205 382/154 |
| 2014/0214749 A1 | 7/2014 | Ruehle | |
| 2015/0269744 A1 | 9/2015 | Mukherjee et al. | |
| 2017/0277521 A1 | 9/2017 | Sharma | |
| 2017/0293670 A1 | 10/2017 | Wang | |
| 2019/0137979 A1 | 5/2019 | Akella | |
| 2019/0205667 A1 | 7/2019 | Avidan | |
| 2020/0184278 A1 | 6/2020 | Zadeh | |
| 2021/0001172 A1* | 1/2021 | Namboodiri | G16H 20/30 |
| 2022/0019778 A1* | 1/2022 | Huang | G06F 18/24 |
| 2023/0230354 A1* | 7/2023 | Viehweider | G06V 10/778 382/224 |

OTHER PUBLICATIONS

Yongheng Wang et al.: "Complex Event Processing over distributed probabilistic event streams"; Fuzzy Systems and Knowledge Discovery, 9th International Conference on, IEEE, dated May 29, 2012, pp. 1489-1493.

Amrit Sarkar: "Human Activity and Behavior Recognition in Videos. A Brief Review"; dated Jan. 1, 2014, retrieved from the Internet: URL: www.grin.com/document/276054.

Gal Lavee, et al.: "Understanding Video Events: A Survey of Methods for Automatic Interpretation of Semantic Occurrences in Video"; IEEE Transaction of Systems, Man and Cybernetics: Part C:Applications and Reviews; vol. 39, No. 5, pp. 489-504.

European Search Report from corresponding European Application No. 21178558, dated Nov. 17, 2021, 12 pages.

Office Action and Swedish Search Report from corresponding Swedish Application No. 2050907-1, Feb. 24, 2021, 9 pages.

Toshikazu Wada, et al., "Multiobject Behavior Recognition by Selective Attention", Electronics and Communications in Japan, Part 3, vol. 84, No. 9, 2001, dated 2001, pp. 1031-1041.

Dian Shao, et al., "Finegym: A Hierarchical Video Dataset for Fine-grained Action Understanding"; dated Apr. 14, 2020, 10 pages.

* cited by examiner

Fig. 5B

ELECTRONIC DEVICE AND A RELATED METHOD FOR DETECTING AND COUNTING AN ACTION

RELATED APPLICATION DATA

This application claims the benefit of Swedish Patent Application No. 2050907-1, filed Jul. 17, 2020, the disclosure of which is incorporated herein by reference in its entirety.

TECHNICAL FIELD

The present disclosure pertains to the field of Internet of things. The present disclosure relates to an electronic device and a related method for detecting and counting an action.

BACKGROUND

Real-time automated activity logging, using for example action recognition and temporal action detection approaches, is used in many real-world settings, with applications in areas such as gym exercise logging, sports event analytics (such as soccer games or Olympics), manufacturing performance monitoring and agricultural monitoring (such as health monitoring of livestock).

Action recognition and temporal action detection approaches may require complex trained models and a large amount of data causing a high computational load, in order to generalize sufficiently to different situations, such as different individuals performing the action. Such models are thus impractical to deploy, in particular on resource-constrained devices, such as handheld electronic devices.

SUMMARY

Some action recognition and temporal action detection approaches may extract key points from video sequences using a sliding-window approach, and then train action detection models based on key-point trajectories. Such approaches may determine that a window comprising a plurality of frames corresponds to a specific action based on a detected action of one or more frames of the window and may predict one label, such as action or non-action, for the entire window. However, since the window comprises a plurality of frames, where some of the frames may relate to an action and some may not, the prediction of the labelling of the entire window may be ambiguous. This makes training of the action detection model difficult, which may lead to erroneous detections of actions when using the trained action detection model for action detection purposes.

Accordingly, there is a need for devices and methods for determining and counting an action, which mitigate, alleviate or address the shortcomings existing and provide a reduced computational load and increased accuracy in determining of the action.

An electronic device is provided, the electronic device comprising memory circuitry and processor circuitry. The processor circuitry comprising an action detection circuitry configured to operate according to an action detection model for detecting an action based on a machine-learning scheme. The processor circuitry is configured to obtain sensor data. The processor circuitry may be configured to obtain sensor data by receiving and/or retrieving sensor data. The processor circuitry is configured to generate, based on the sensor data, a set of features associated with a frame. The processor circuitry is configured to determine, based on the set, using the action detection model, whether the frame corresponds to a sub-action. The processor circuitry is configured to apply a nondeterministic finite automaton, NFA, scheme, to the determined sub-action for the frame, wherein the NFA scheme has a set of states associated with corresponding sub-actions and is configured to output one or more action classes. The processor circuitry is configured to determine, using the NFA scheme, an action class. The processor circuitry is configured to detect the action based on the action class. The processor circuitry is configured to increment an action counter based on the detected action.

Further, a method is disclosed, performed by an electronic device, for counting an action. The method comprises obtaining sensor data. The method comprises generating, based on the sensor data, a set of features associated with a frame. The method comprises determining, based on the set, using an action detection model, whether the frame corresponds to a sub-action, wherein the action detection model is based on a machine-learning scheme. The method comprises applying a nondeterministic finite automaton, NFA, scheme to the determined sub-action for the frame, wherein the NFA scheme has a set of states associated with corresponding sub-actions and is configured to output one or more action classes. The method comprises determining, using the NFA scheme, an action class. The method comprises detecting the action based on the action class. The method comprises incrementing an action counter based on the detected action.

It is an advantage of the present disclosure that the computational load for running the action detection model is reduced while accuracy in determining the actions is increased. Also, the required amount and the complexity of training data can be reduced.

By determining whether a frame corresponds to a sub-action, rather than a complete window, the learning task is simplified and less ambiguous. Thereby, a more lightweight model may be used.

Further, by reducing the computational load of the action detection model, the action detection model may be used on electronic user devices in a real-time setting, such as for monitoring and counting gym exercises using a handheld device, such as a smart phone, or other low-powered embedded edge devices, such as a computer that extracts features from a video stream.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Action recognition and temporal action detection approaches may be divided into two main categories, methods using sensors mounted on a tracked subject, such as accelerometers and gyroscopes, and relying on e.g. Inertial Measurement Unit (IMU) data from the sensors mounted on the tracked subject, and methods using sensors arranged at a distance from the tracked subject, such as image sensors, operating on visual input data, such as color, optical flows, light intensity, and depth.

Action recognition and temporal action detection methods using sensors mounted on the tracked subject may be limited by the fact that the sensors are only able to track the movements of the parts of the objects that they are attached to, thus restricting their possible use-cases.

Action recognition and temporal action detection methods using sensors arranged at a distance from the tracked subject, such as image sensors, may be divided into two sub-categories. End-to-end methods that learn complex mappings from video directly to the target action classes, requiring complex models and a large amount of data in order to generalize well to different situations, making them impractical to deploy, in particular on resource-constrained devices. An alternative is to first extract key points (such as human joints) from video sequences, and then to train action detection models based on key-point trajectories. The trajectories may comprise two-dimensional (2D) key point coordinates, or three-dimensional (3D) key point coordinates triangulated via a multi camera setup. Furthermore, the required amount and the complexity of the training data can be significantly reduced when working with key points, making this a more attractive option for real world deployment.

There are a few different approaches to perform action detection on key-point trajectories.

In sliding-window frame-wise action prediction methods, the model takes as input a window of key-point trajectories, and outputs an action class prediction for each frame of the window. The present disclosure provides for implementations in a real-time setting, where the sliding-window approach may be applied.

The present disclosure provides a solution for detecting and counting actions, such as well-defined actions and sub-actions, such as performing deadlifts, squats, or swinging a bat, where salient action motion patterns are similar for all instances of an action and where appearance features are not critical for detection of an action. Counting may be important for logging of actions, useful for the gym, and manufacturing processes for checking how many times the process is repeated.

A difference between the solution provided in the current disclosure and existing sliding-window approaches is in the formulation of the learning problem. Existing approaches typically classify the action class for each window or frame. In contrast, the machine learning scheme of the current disclosure is trained to classify whether a frame corresponds to a start or an end of a fine-grained and precisely defined sub-action. For example, to detect repetitions of a deadlift exercise, existing approaches output whether a window or frame corresponds to the deadlift action class or not, wherein the disclosed technique outputs whether a specific frame in a window corresponds to the start or end of the deadlift, or the start or end of intermediate steps (sub-actions) of performing the deadlift.

An advantage of the present disclosure is that it simplifies the learning task and reduces ambiguity in predicting the labelling. This may be especially beneficial if there are non-activity segments intertwined within an action segment.

The detecting and counting of the action may be performed in real-time, for example using video from an image sensor as input data, such as when recording an exercise in a gym.

Figure 1:
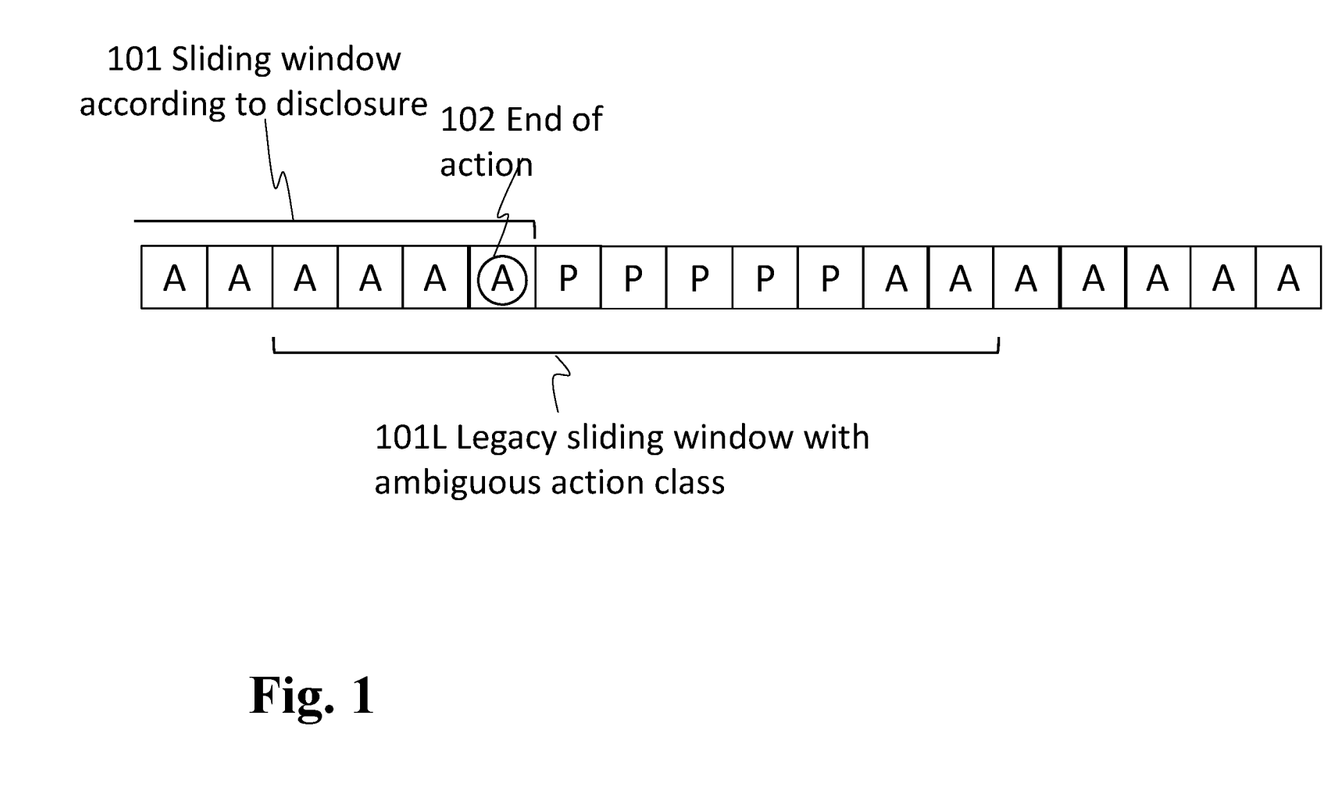
FIG. 1 is a diagram illustrating an example data set relating to an exercise set of a person doing a workout session, according to one or more examples of the current disclosure.

FIG. 1 discloses a data set relating to an exercise set of a person doing a workout session, according to an example embodiment of the current disclosure. The data set comprises a plurality of frames, such as data points, such as image frames. During the workout session, the person may briefly pause in the middle of the exercise set. In the example shown in FIG. 1, "A" denotes a frame with an action or sub-action and "P" denotes a frame where the person paused. As can be seen in FIG. 1, the legacy sliding window 101L covering these the data set may in many cases contain both frames with an action and frames without an action (such as frames where the person pauses). Existing approaches may take a sliding window 101L of for example 10 frames and try to predict one label (A or P) for the entire window. For many locations of the sliding window 101L, such as in the location shown in FIG. 1 where the sliding window 101L comprises five frames labelled A and five frames labelled B, the label assigned to the window during training is thus ambiguous. This makes training of the action detection model using this approach difficult.

In the learning approach according to the current disclosure, the learning of the model may be focused on a time point, such as a frame, where the action changes, such as when the action starts or ends. During training of the machine learning scheme, a window 101 may be labelled with an action class when a specific frame 102 in the window (e.g. the last frame) corresponds to a precisely defined point of the action, such as the start point or the end point of the action, and otherwise be labelled with the non-activity NULL class. Accordingly, in the example shown in FIG. 1, only when the specific frame 102 in the window corresponds to the frame circled out, which in this case is the end of an action or sub-action, then the window 101 may be determined and labelled by the model as an action or sub-action. When the specific frame 102 of the window 101 corresponds to any other frame, such as other than a start and/or an end of an action or sub-action, the window may be labelled by the model as a background NULL class. Whether the end or the start of an action is used for determining the action class for the window may depend on the application, such as depend on the type of action or sub-action that is monitored.

The solution provided in the current disclosure may further be enhanced to handle more complex action classes where one has a choice of different sub-actions, or where the order of the sub-actions is flexible. An example of a scenario for which the order of the sub-actions is flexible is manufacturing where several sub-actions may be required to assemble a product. The sub-actions may for example be performed in different orders but leading to the same final result, such as to the same action. This may be done using a nondeterministic finite automaton (NFA). An NFA is represented formally by a finite set of states (such as an initial state, one or more intermediate states and a set of end states distinguished as accepted final states), a finite set of input symbols, and a transition function for transitioning between states. The initial state and all intermediate states may have self-loops associated with all sub-actions to allow for false detections. State transitions may be triggered by the detection of sub-actions. When the NFA has transitioned to an end state, an output, such as an action class may be reached. When an end state is reached in the NFA, the NFA may output the action class of the action associated with the terminal state and an action is detected. When the output is reached, the initial state is reinstated, and the NFA is reinitialized (such as by defining a path of sub-actions until output of an action class).

Figure 2:
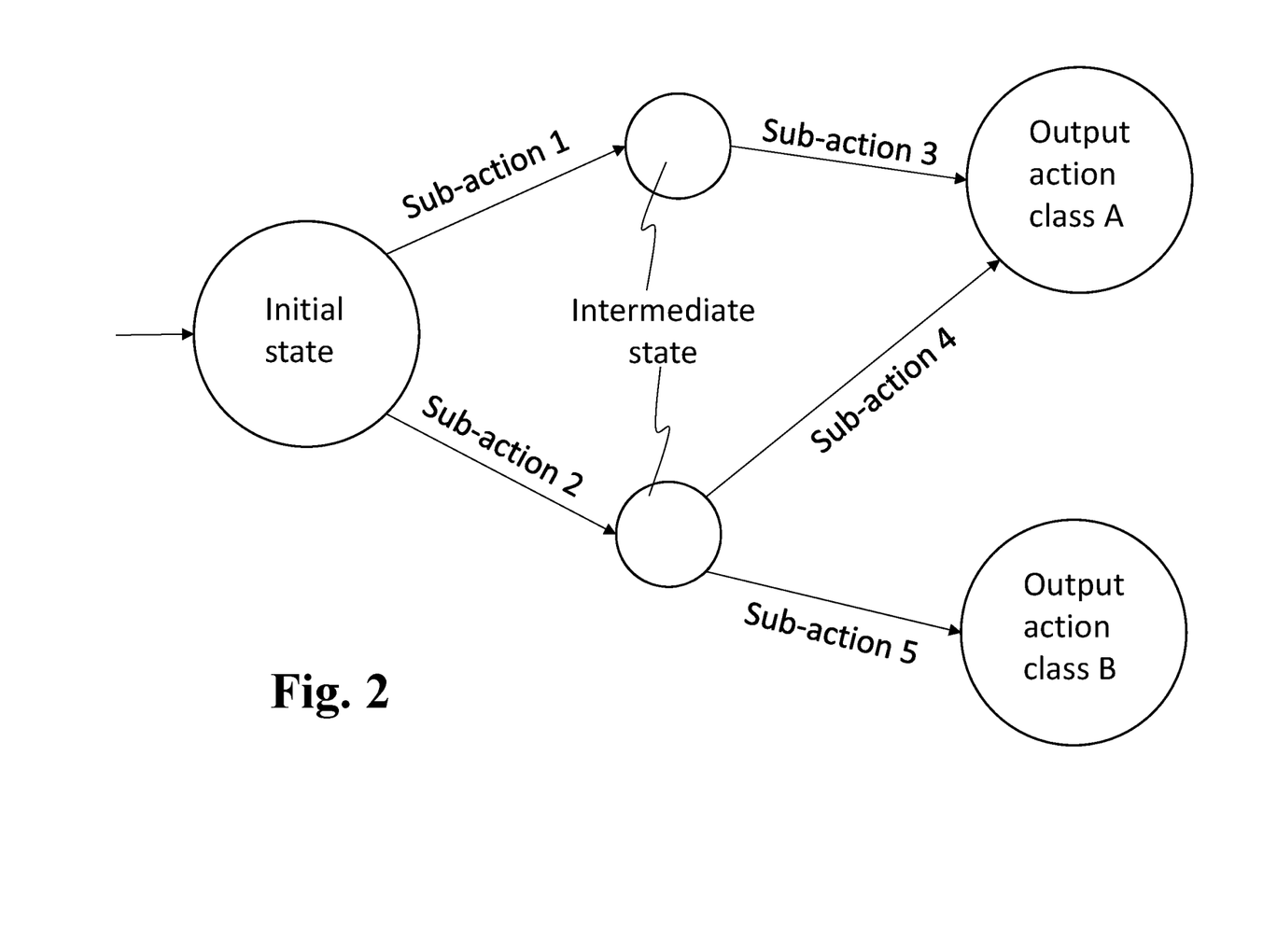
FIG. 2 is a diagram illustrating an example nondeterministic finite automaton according to one or more examples of this disclosure.

FIG. 2 shows an example of an NFA according to the present disclosure. The NFA may comprise an initial state, zero or more intermediate states and one or more end states, such as one or more terminal states. In the example shown in FIG. 2, the NFA comprises two intermediate states and two terminal states, each terminal state corresponding to an output action class, such as an output class A or an output class B as shown in FIG. 2. In some example NFAs according to the current disclosure, the NFA may be related to e.g. training, and may comprise a first action class A associated with a first exercise, such as to a deadlift, and a second action class B associated with a second exercise, such as to a squat. Each action may comprise sub-actions for parts of the exercise, such as to a motion of the exercise. For the action deadlift, a first sub-action may for example be "standing upright" and a second sub-action may for example be "placing bar back on the ground". Upon determination of a first sub-action, such as sub-action 2 in FIG. 2, the NFA transitions to a first intermediate state associated with the determined sub-action. The NFA remains in the intermediate state until a second sub-action is detected. When the second sub action is detected, such as sub-action 4 in FIG. 2, the NFA transitions to a first end state associated with the second sub action, and outputs an action class associated with the end state, such as output action class A in FIG. 2. In the current example, action class A is associated with the deadlift and thus the action deadlift is detected based on the output class.

Figure 3:
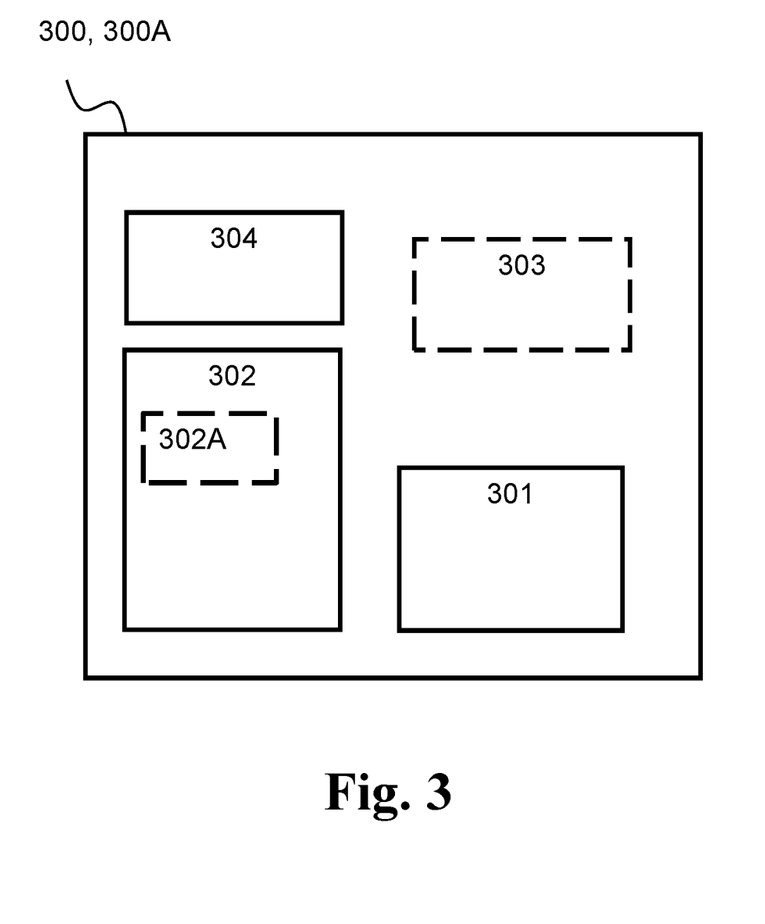
FIG. 3 is a block diagram illustrating an example electronic device according to this disclosure.

FIG. 3 shows a block diagram of an example electronic device 300, 300A according to some embodiments of the present disclosure. The electronic device 300 comprises memory circuitry 301, processor circuitry 302 comprising an action detection circuitry 302A configured to operate according to an action detection model for detecting an action based on a machine-learning scheme. The action comprises one or more sub-actions. Where an action only has one sub-action, the sub action and the action are effectively the same. An action detection model may be seen as a model configured to detect an action based on sensor data, wherein an action may be performed by an object and/or a subject. For example, an action detection model may exploit media processing, such as image processing, such as video processing. In other words, the action may be detected based on a processing of the obtained sensor data, wherein the sensor data may comprise media data. Stated differently, the action may be detected based on a processing of media data. In one or more examples, the action may be or comprise a movement and/or a combination of movements of an object and/or a subject, such as of a person, such as of a body part of a person. The sensor data may be indicative of a movement and/or a combination of movements of the object and/or the subject (such as a body part of the subject and/or a part of the object).

The electronic device 300 may comprise associated sensor circuitry 304 configured to generate the sensor data. The electronic device 300 may be an electronic user device 300A, such as a handheld device, a tablet or a smartphone.

The processor circuitry 302 is configured to obtain sensor data, such as a stream of sensor data. The sensor data may comprise one or more of: accelerometer data from a sensor device such as an accelerometer, light data from a photosensor, sound data (such as voice) data from a microphone, image sensor data (such as photo or video data from a camera), temperature data from a thermometer, pressure data from a pressure sensor, positioning data from a global positioning system (GPS) and/or humidity data from a hygrometer.

The sensor data may be obtained from for example an associated sensor circuitry 304. In the example electronic device 300A, the associated sensor circuitry 304 is internal in the electronic device 300A. In some example electronic devices 300, the associated sensor circuitry 304 may be an external sensor circuitry. The sensor circuitry may e.g. be an image-sensor (such as a camera), an accelerometer, a photo sensor (such as an infrared sensor), a sound sensor (such as a microphone), a temperature sensor (such as a thermometer), a pressure sensor, and/or a hygrometer. The sensor data may be raw sensor data or a processed and/or aggregated version of the sensor data.

The processor circuitry 302 is configured to generate, based on the sensor data, a set of features associated with a frame. A feature may be seen as a data point characterizing an individual measurable property or characteristic of a phenomenon being observed, such as a joint of a subject. The set of features may e.g. comprise a set of key points and/or a set of key point trajectories, such as 2D or 3D key-point trajectories of arbitrary length. These set of features may be obtained using a range of techniques and technologies; such as computer vision and machine learning techniques or using specialized technologies such as motion capture systems. In some examples where the disclosed technique is applied, the set of features may be key points, such as joints of a person performing an action, such as a deadlift. A key point trajectory may be seen as a time-series comprising a 2D and/or 3D position, such as a coordinate, of a key point over time. The processor circuitry 302 may be configured to generate the set of features associated with the frame using a sliding window with a number of frames. A window may comprise one or more frames. The sliding window approach may be used on a stream of input data, such as on a stream of obtained sensor data, to extract a window of key-point trajectories. The sensor data may be sampled at various time steps, where each sample may comprise a fixed or varying number of features. Each frame of the window may represent one sample of sensor data. In other words, the processor circuitry 302 may be configured to generate, based on sensor data in a sliding window with a number of samples, the set of features associated with a frame. This input may be fed into a trained model, such as the action detection model, to detect sub-actions.

In one or more example electronic devices, the processor circuitry 302 is configured to update, such as move, the sliding window. The sliding window may be updated once a set of features has been generated for each frame in a window. The sliding window is then moved to a new set of frames, such as a new set of frames from the obtained sensor data.

The processor circuitry 302 is configured to determine, based on the set of features, using the action detection model, whether the frame corresponds to a sub-action. In one or more example electronic devices, processor circuitry 302 may be configured to determine whether the frame corresponds to the sub-action, based on a detection of a start of the sub-action or an end of the sub-action using the set and the action detection model. The processor circuitry may e.g. be configured to determine that the frame corresponds to the sub-action when the frame is determined to correspond to a start or an end of the sub-action. In other words, the machine learning scheme of the current disclosure may be capable (such as trained) of classifying whether a frame corresponds to a start or an end of a sub-action (such as a fine-grained and precisely defined sub-action). For example, to detect repetitions of a deadlift exercise, the electronic device can output whether a specific frame in a window corresponds to the start or end of the deadlift, or the start or end of intermediate steps (sub-actions) of performing the deadlift.

In an illustrative example where the disclosed technique is applied, the processor circuitry 302 may be configured to determine, using the action detection model, whether the frame corresponds to a sub-action based on detection of key-point trajectories. The processor circuitry 302 may use a sliding-window action prediction method, in which the action detection model uses a window of key-point trajectories as input, and outputs whether a specific frame in the window corresponds to the start or end of an action, such as a deadlift, or the start or end of an sub-action, such as an intermediate step of performing the deadlift. A size of the window may determine how much context, such as data points, such as frames, is taken into account for each prediction.

The processor circuitry 302 is configured to apply a nondeterministic finite automaton, NFA, scheme, to the determined sub-action for the frame. The NFA scheme has a set of states associated with corresponding sub-actions and is configured to output one or more action classes. The NFA may comprise a plurality of actions and/or sub actions. Terminal states may relate to actions, while transitions between states relate to sub-actions. The processor circuitry 302 is configured to determine, using the NFA scheme, an action class. In one or more example electronic devices 300, the determination of the action class comprises labelling of the frame with the action class. The determination of the action class may comprise predicting and/or labelling of a specific frame, such as the frame corresponding to the start and/or the end of the action, within a window with the action class. FIG. 2 illustrates an example of an NFA.

The processor circuitry 302 is configured to detect the action based on the action class. An action class may be seen as a type of actions, such as a category of actions, to be used for classifying. An action class may for example be, such as may be associated with, a type of activity, such as performing a deadlift, waving or jumping. An action class may, in one or more examples, be indicative of an action. In one or more examples, an action class may be a type of activity, such as a type of an exercise. Examples of types of activity may include types of training exercises, such as a deadlift, a squat and/or a bench press. In other words, an action class may be associated with and/or indicative of a movement and/or a combination of movements, such as a predetermined movement and/or combination of movements. The movement and/or combination of movements may be a movement performed by an object and/or a subject, such as by a person, such as by a body part of a person.

The processor circuitry 302 is configured to increment an action counter based on the detected action. Once an action has been detected the processor circuitry may increment an action counter associated with the detected action. The processor circuitry 302 may thus count the number of times an action is repeated, such as the number of repetitions of deadlifts a person performs during a training session. The processor circuitry 302 may be configured to, based on other information, such as an amount of time between repetitions or a particular training program that the individual is on, count sets of repetitions of an action. This may also be applied to other scenarios where knowledge can be derived from time of start and/or completion of one or more actions.

In one or more example electronic devices, the processor circuitry 302 is configured to perform, using the NFA scheme, a state transition from a state associated with the sub-action to another state associated with another sub-action. The state transition in the NFA may be triggered by the determination of a sub-action. In other words, when the sub action is determined the state transition is performed.

In one or more example electronic devices, the processor circuitry 302 may be configured to initialize the NFA scheme. The NFA scheme may be initialized when subject to be tracked, such as an individual, such as a person, is detected. The NFA may be implemented by keeping track of a set of states during runtime. In one or more example electronic devices, Kleene's algorithm may be used to convert the NFA into a deterministic finite automaton (DFA), against which the action detection sequence may be checked.

In one or more example electronic devices, the processor circuitry 302 is configured to repeat for a series of frames, such as for each frame of a series of frames: the determination, based on the set, using the action detection model, of whether the frame corresponds to a sub-action, and the application of the NFA scheme to the determined sub-action for the frame.

In one or more example electronic devices, the processor circuitry 302 is configured to perform post-processing of a sub-action prediction, such as online post-processing of the sub-action prediction, to filter out false determinations of sub-actions. In one or more example electronic devices, the processor circuitry 302 is configured to perform a number of determinations for a number of consecutive frames above a threshold before detecting a sub-action. The threshold may correspond to a minimum number (e.g. 2 or more) of consecutive frame predictions to be made before a sub-action is determined. The threshold may be a configurable threshold based on e.g. sampling rate, false positive and/or false negative requirements. This logic may be incorporated into the NFA.

In one or more example electronic devices, the determination of the sub-action is performed after expiry of a time period. The processor circuitry may be configured to require a minimum number of time steps, minTimeSteps, between two sub-action determinations. To implement this, the NFA may be augmented to comprise temporal information. The NFA may e.g. comprise a chain of minTimeSteps states after each sub-action detection state, with all possible actions resulting in a transition to the next state. In order to reduce the number of states in the NFA, a variable may be used to keep track of the number of time-steps that have passed since the most recent sub-action determination, to determine whether a transition can be made in the NFA. To use the second approach the NFA can be implemented by using a set data structure of all states which the NFA might currently be in.

In one or more example electronic devices, the machine-learning scheme, and the action detection model based on the machine learning scheme, is trained using a supervised scheme on the features for sub-action determination. The machine learning scheme may be trained by extracting key points (such as human joints) from one or more video sequences, such as video sequences of the subject performing the action, and then train the machine learning scheme based on the extracted key points, such as based on extracted key-point trajectories. The trajectories may comprise 2D key point coordinates, or 3D key point coordinates triangulated via a multi camera setup. Since different actions have different key-point trajectories, the key point trajectories allow actions to be distinguished from each other. Furthermore, by using key point trajectories, instead of high-dimensional image/video data, the required amount and the complexity of the training data can be significantly reduced.

In one or more example electronic devices, the machine-learning scheme comprises a supervised machine learning scheme. The supervised machine learning scheme may comprise one or more of: a Convolutional Neural Network, Graph Convolutional Network, a random forest scheme, a gradient boosting scheme, linear models and Recurrent Neural Network.

The machine learning scheme may be trained in a supervised fashion on the key-point trajectories for the task of action detection, such as sub-action detection. The machine learning scheme may be trained using a gradient-based optimizer, such as Adam. During training of the machine learning scheme, a window may be labelled with an action class when a specific frame in the window (e.g. the last frame) corresponds to a precisely defined point of the action, such as the start point or the end point of the action, and otherwise be labelled with the non-activity NULL class. The machine learning scheme may be trained by optimizing an objective function. The machine learning scheme may be trained using a gradient based optimizer, such as a formal loss function, such as a formal loss function with a combination of cross-entropy classification loss and a mean squared error loss, that penalizes predictions that are far away in time from a matching ground truth sub-action label. Data augmentation (such as perturbing an individual's, such as a person's, joints with Gaussian noise, random scaling, rotation, temporal augmentation) may be used to improve the robustness of the machine learning scheme by introducing more variability in the training data.

An example of a formal loss function which may be applied for training of the machine learning scheme according to the current disclosure is shown in equation (1):

$$\text{loss}(\hat{y}, c, \hat{t}, t_c) = -\log\left(\frac{\exp(\hat{y}_c)}{\sum_{i=1}^{N} \exp(\hat{y}_i)}\right) + \gamma \min(|\hat{t} - t_c|, \alpha)^2, \quad (1)$$

where $\hat{y}$ is an N-dimensional vector of predicted scores, one score for each of the N sub-action classes (including the NULL activity class), c is the ground-truth class, $\hat{t}$ is the predicted time-step (what time-step the start and/or end of sub-action prediction refers to, depends on how windows are assigned to a class during training, e.g. a window may be defined to correspond to the end of a sub-action during training, if the last data sample in the window is annotated with an end of that sub-action), tc is the time-step of the nearest-in-time ground-truth class c activity, $\alpha$ is a parameter to limit the size of the second loss term, and $\gamma$ controls the contribution of the second loss term.

The first loss term is the cross-entropy loss, which is widely used in classification problems. The second loss term is designed to incur a higher loss on predictions that are further away from the nearest ground-truth label, with the objective of guiding the network to make more precise predictions of a start and/or an end of action. The $\alpha$ parameter limits the size of the squared term to avoid very large losses for predictions that are very far away from a ground-truth label. Other loss functions for binary and/or multi-class classification, such as focal loss, class-weighted cross entropy loss or hinge loss functions, may also be used for training the machine learning scheme according to the current disclosure.

The electronic device 300 may comprise an interface 303 configured to communicate with an external device (such as a server, a sensor, another electronic device).

Figure 4:
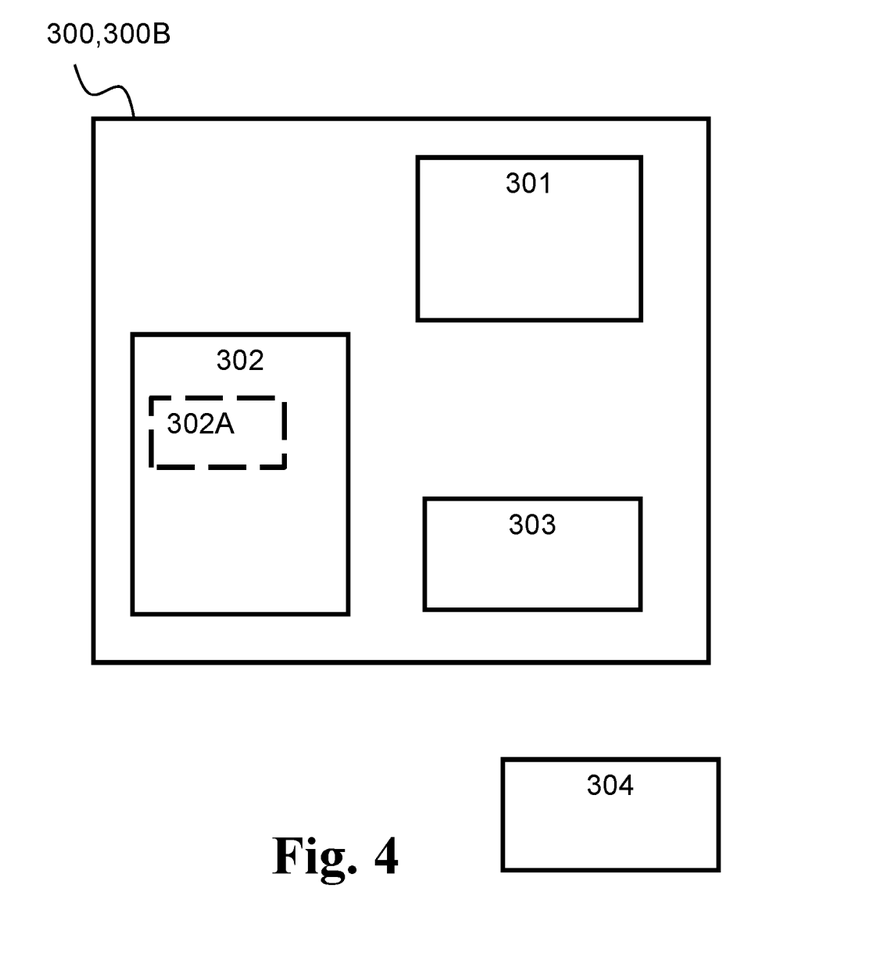
FIG. 4 is a block diagram illustrating an example electronic device according to this disclosure.

FIG. 4 shows a block diagram of an example electronic device 300, 300B according to some embodiments of the present disclosure. The electronic device 300, 300B comprises memory circuitry 301, processor circuitry 302 comprising an action detection circuitry 302A configured to operate according to an action detection model for detecting an action based on a machine-learning scheme. The action comprises one or more sub-actions. Where an action only has one sub-action, the sub action and the action are effectively the same. The electronic device 300 may comprise an interface 303 configured to communicate with an external device (such as a server, a sensor, another electronic device). The electronic device 300 is configured to communicate, such as via the interface 303, with an associated sensor circuitry 304, such as an external sensor device, configured to generate the sensor data. In the example electronic device 300 shown in FIG. 4, the electronic device 300 may be a server device 300B. The server device 300B may be configured to communicate with the associated sensor circuitry 304 via an interface 303, such as a wireless or wired interface, to obtain sensor data.

The processor circuitry 302 is configured to obtain sensor data, such as a stream of sensor data.

The processor circuitry 302 is configured to generate, based on the sensor data, a set of features associated with a frame.

The processor circuitry 302 is configured to determine, based on the set, using the action detection model, whether the frame corresponds to a sub-action.

The processor circuitry 302 is configured to apply the nondeterministic finite automaton, NFA, scheme, to the determined sub-action for the frame, wherein the NFA scheme has a set of states associated with corresponding sub-actions and is configured to output one or more action classes.

The processor circuitry 302 is configured to detect the action based on the action class.

The processor circuitry 302 is configured to increment an action counter based on the detected action.

Figure 5A:
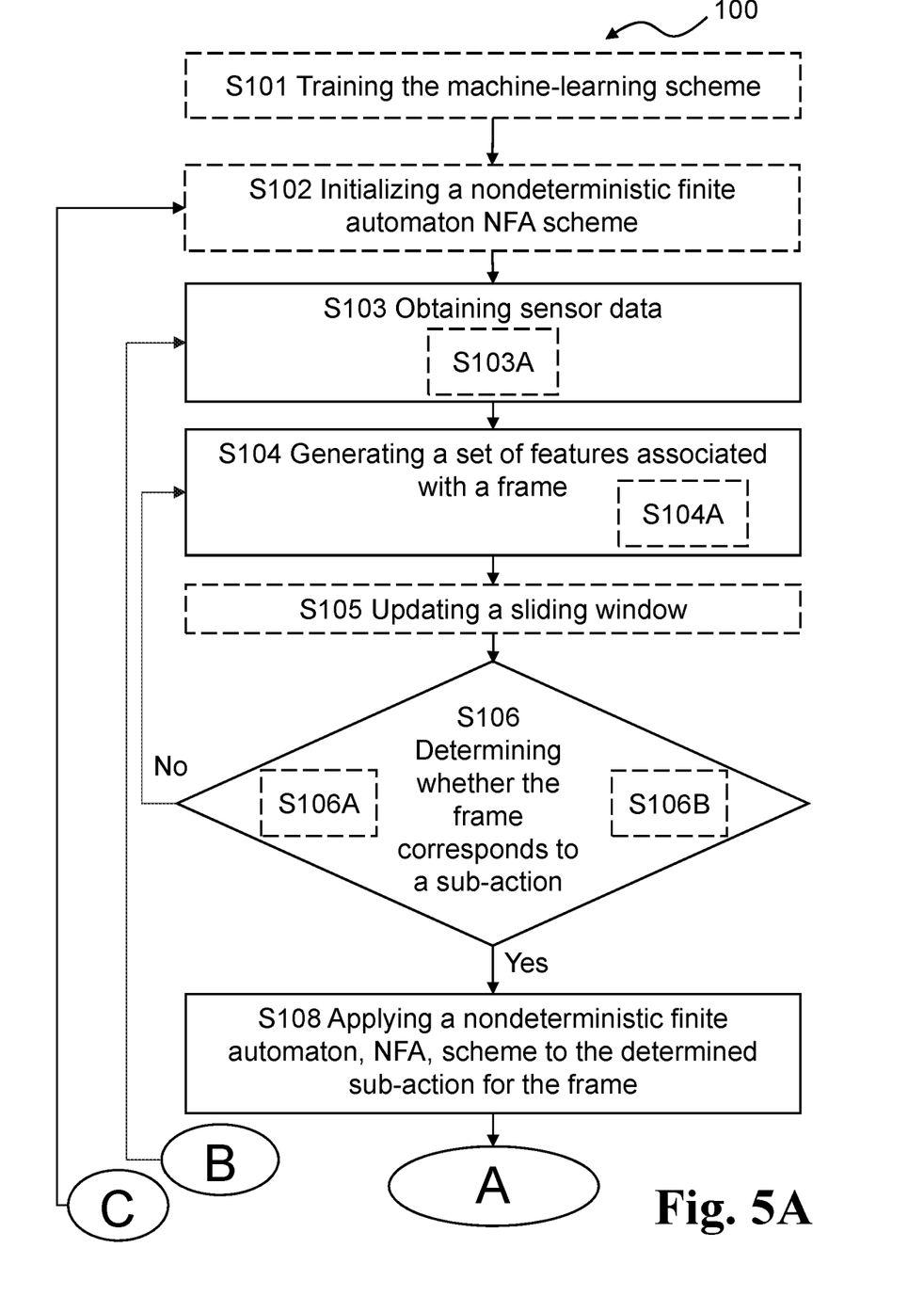
FIGS. 5A and 5B depict a flow-chart illustrating an example method, performed at an electronic device, for counting an action according to this disclosure.
Figure 5B:
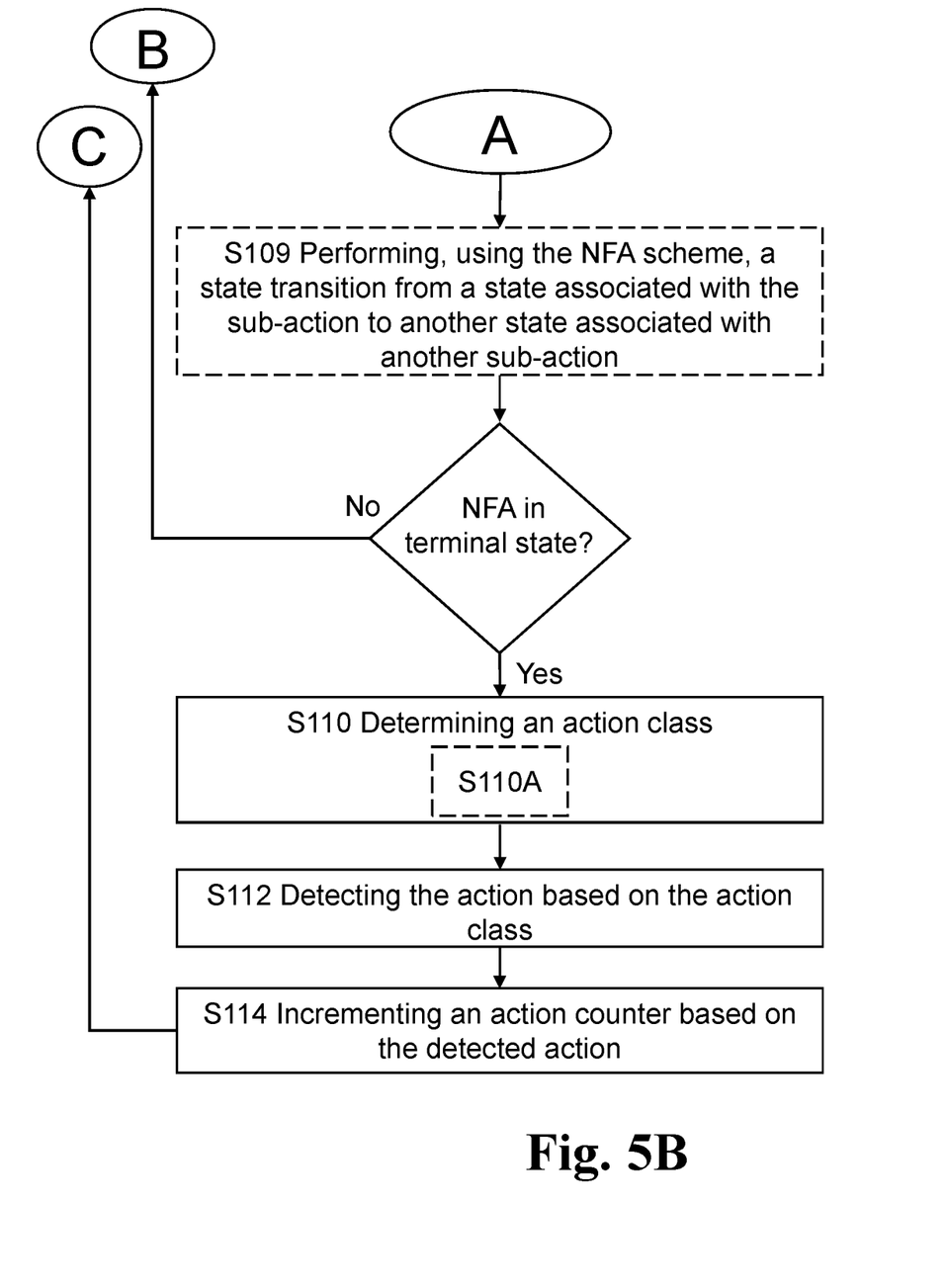

The electronic device 300, 300A, 300B, is optionally configured to perform any of the operations disclosed in FIGS. 5A and 5B (such as any one or more of S101, S102, S103, S103A, S104, S104A, S105, S106, S106A, S108, S109, S110, S112, S114). The operations of the electronic device 300 may be embodied in the form of executable logic routines (for example, lines of code, software programs, etc.) that are stored on a non-transitory computer readable medium (for example, memory circuitry 301) and are executed by processor circuitry 302.

Furthermore, the operations of the electronic device 300, 300A, 300B may be considered a method that the electronic device 300, 300A, 300B is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIGS. 3 and 4). Memory circuitry 301 is considered a non-transitory computer readable medium.

Memory circuitry 301 may be configured to store information (such as information indicative of sub-actions or actions, NFA schemes, information related to the action counter, training data, trained action detection model) in a part of the memory.

FIGS. 5A-5B are flow-charts illustrating an example method 100, performed at an electronic device (such as the sensor device 300, 300A, 300B of FIGS. 3 and 4), for counting an action according to this disclosure. The action comprises one or more sub-actions. Where an action only has one sub-action, the sub action and the action are effectively the same.

The method 100 comprises obtaining S103 sensor data.

The method 100 comprises generating S104, based on the sensor data, a set of features associated with a frame.

The method 100 comprises determining S106, based on the set, using an action detection model, whether the frame corresponds to a sub-action, wherein the action detection model is based on a machine-learning scheme.

The method 100 comprises applying S108 a nondeterministic finite automaton, NFA, scheme to the determined sub-action for the frame, wherein the NFA scheme has a set of states associated with corresponding sub-actions and is configured to output one or more action classes.

The method 100 comprises determining S110, using the NFA scheme, an action class.

The action class may be determined upon the scheme reaching a terminal state.

The method 100 comprises detecting S112 the action based on the action class.

The method 100 comprises incrementing S114 an action counter based on the detected action.

In one or more example methods, the method 100 comprises performing S109, using the NFA scheme, a state transition from a state associated with the sub-action to another state associated with another sub-action.

In one or more example methods, determining S110 of the action class comprises labelling S110A of the frame with the action class.

In one or more example methods, the method 100 comprises initializing S102 the NFA scheme.

In one or more example methods, the method 100 comprises training S101 the machine-learning scheme using a supervised scheme on the features for sub-action determination.

In one or more example methods, the machine-learning scheme comprises a supervised machine learning scheme.

In one or more example methods, the supervised machine learning scheme comprises one or more of: a Convolutional Neural Network, Graph Convolutional Network, a random forest scheme, a gradient boosting scheme, linear models and Recurrent Neural Network.

In one or more example methods, the method 100 comprises repeating, for a series of frames: determining S106, based on the set, using the action detection model, whether the frame corresponds to a sub-action, and applying S108 the NFA scheme to the determined sub-action for the frame.

In one or more example methods, the method 100 comprises performing a number of determinations S106A for a number of consecutive frames above a threshold before detecting a sub-action.

In one or more example methods, the detection of the sub-action is performed after expiry of a time period.

In one or more example methods, obtaining S103 sensor data comprises generating S103A, using associated sensor circuitry, the sensor data.

In one or more example methods, the generating S104 the set of features associated with the frame comprises generating S104A the set of features using a sliding window with a number of frames.

In one or more example methods, the method 100 comprises updating S105 the sliding window.

In one or more example methods, determining S106, based on the set, using the action detection model, whether the frame corresponds to the sub-action comprises detecting S106B a start of the sub-action or an end of the sub-action using the set and the action detection model.

Embodiments of methods and products (electronic device) according to the disclosure are set out in the following items:

Item 1. An electronic device (300) comprising:
  memory circuitry (301), and
  processor circuitry (302) comprising an action detection circuitry (302A) configured to operate according to an action detection model for detecting an action based on a machine-learning scheme, wherein the action comprises one or more sub-actions;
  the processor circuitry (302) being configured to:
    obtain sensor data;
    generate, based on the sensor data, a set of features associated with a frame,
    determine, based on the set, using the action detection model, whether the frame corresponds to a sub-action,
    apply a nondeterministic finite automaton, NFA, scheme, to the determined sub-action for the frame, wherein the NFA scheme has a set of states associated with corresponding sub-actions and is configured to output one or more action classes;
    determine, using the NFA scheme, an action class;
    detect the action based on the action class; and
    increment an action counter based on the detected action.

Item 2. The electronic device according to Item 1, wherein the processor circuitry (302) is configured to perform, using the NFA scheme, a state transition from a state associated with the sub-action to another state associated with another sub-action.

Item 3. The electronic device according to any of the previous Items, wherein the determination of the action class comprises a labelling of the frame with the action class.

Item 4. The electronic device according to any of the previous Items, wherein the processor circuitry (302) is configured to initialize the NFA scheme.

Item 5. The electronic device according to any of the previous Items, wherein the machine-learning scheme is trained using a supervised scheme on the features for sub-action determination.

Item 6. The electronic device according to any of the previous Items, wherein the machine-learning scheme comprises a supervised machine learning scheme.

Item 7. The electronic device according to Item 6, wherein the supervised machine learning scheme comprises one or more of: a Convolutional Neural Network, a Graph Convolutional Network, a random forest scheme, a gradient boosting scheme, linear models and Recurrent Neural Network.

Item 8. The electronic device according to any of the previous Items, wherein the processor circuitry (302) is configured to repeat for each of a series of frames:
the determination, based on the set, using the action detection model, of whether the frame corresponds to a sub-action, and
the application of the NFA scheme to the determined sub-action for the frame.

Item 9. The electronic device according to any of the previous Items, wherein the processor circuitry (302) is configured to perform a number of determinations for a number of consecutive frames above a threshold before detecting a sub-action.

Item 10. The electronic device according to any of the previous Items, wherein the determination of the sub-action is performed after expiry of a time period.

Item 11. The electronic device according to any of the previous Items, the electronic device (300) comprising associated sensor circuitry (304) configured to generate the sensor data.

Item 12. The electronic device according to any of the previous Items, wherein the electronic device (300) is an electronic user device (300A).

Item 13. The electronic device according to any of Items 1-11, wherein the electronic device (300) is a server device (300B).

Item 14. The electronic device according to any of the previous Items, wherein the set of features associated with the frame is generated using a sliding window with a number of frames.

Item 15. The electronic device according to Item 14, wherein the processor circuitry (302) is configured to update the sliding window.

Item 16. The electronic device according to any of the previous Items, wherein the determining, based on the set, using the action detection model, whether the frame corresponds to the sub-action is based on a detection of a start of the sub-action or an end of the sub-action using the set and the action detection model.

Item 17. A method, performed by an electronic device, for counting an action, wherein the action comprises one or more sub-actions, the method comprising:
obtaining (S103) sensor data;
generating (S104), based on the sensor data, a set of features associated with a frame,
determining (S106), based on the set, using an action detection model, whether the frame corresponds to a sub-action, wherein the action detection model is based on a machine-learning scheme,
applying (S108) a nondeterministic finite automaton, NFA, scheme to the determined sub-action for the frame, wherein the NFA scheme has a set of states associated with corresponding sub-actions and is configured to output one or more action classes;
determining (S110), using the NFA scheme, an action class;
detecting (S112) the action based on the action class; and
incrementing (S114) an action counter based on the detected action.

Item 18. The method according to Item 17, wherein the method comprises:
performing (S109), using the NFA scheme, a state transition from a state associated with the sub-action to another state associated with another sub-action.

Item 19. The method according to Item 17 or 18, wherein determining (S110) of the action class comprises labelling (S110A) of the frame with the action class.

Item 20. The method according to any of the previous Items 17 to 19, wherein the method comprises initializing (S102) the NFA scheme.

Item 21. The method according to any of the previous Items 17 to 20, wherein the method comprises training (S101) the machine-learning scheme using a supervised scheme on the features for sub-action determination.

Item 22. The method according to any of the previous Items 17 to 21, wherein the machine-learning scheme comprises a supervised machine learning scheme.

Item 23. The method according to Item 22, wherein the supervised machine learning scheme comprises one or more of: a Convolutional Neural Network, Graph Convolutional Network, a random forest scheme, a gradient boosting scheme, linear models and Recurrent Neural Network.

Item 24. The method according to any of the previous Items 17 to 23, wherein the method comprises repeating, for a series of frames:
determining (S106), based on the set, using the action detection model, of whether the frame corresponds to a sub-action, and
applying (S108) the NFA scheme to the determined sub-action for the frame.

Item 25. The method according to any of the previous Items 17 to 24, wherein the method comprises performing a number of determinations (S106A) for a number of consecutive frames above a threshold before detecting a sub-action.

Item 26. The method according to any of the previous Items 17 to 25, wherein the determination of the sub-action is performed after expiry of a time period.

Item 27. The method according to any of the previous Items 17 to 26, wherein obtaining (S103) sensor data comprises generating (5103A), using associated sensor circuitry, the sensor data.

Item 28. The method according to any of the Items 17 to 27, wherein the generating (S104) the set of features associated with the frame comprises generating (S104A) the set of features using a sliding window with a number of frames.

Item 29. The method according to Item 28, wherein the method comprises updating (S105) the sliding window.

Item 30. The method according to any of the Items 17 to 29, wherein determining (S106), based on the set, using the action detection model, whether the frame corresponds to the sub-action comprises detecting (S106B) a start of the sub-action or an end of the sub-action using the set and the action detection model.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5B comprises some circuitries or operations which are illustrated with a solid line and some circuitries or operations which are illustrated with a dashed line. Circuitries or operations which are comprised in a solid line are circuitries or operations which are comprised in the broadest example embodiment. Circuitries or operations which are comprised in a dashed line are example embodiments which may be comprised in, or a part of, or are further circuitries or operations which may be taken in addition to circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device comprising:
   memory circuitry; and
   processor circuitry comprising an action detection circuitry configured to operate according to an action detection model for detecting an action based on a machine-learning scheme, wherein the action comprises one or more sub-actions;
   the processor circuitry being configured to:
      obtain sensor data;
      generate, based on the sensor data, a set of features associated with a frame;
      determine, based on the set of features associated with the frame, using the action detection model, whether the frame corresponds to a sub-action, wherein the processor circuitry is configured to perform determinations for a number of consecutive frames above a threshold number of consecutive frames as corresponding to the sub-action before determining whether the frame corresponds to the sub-action;
      apply a nondeterministic finite automaton, NFA, scheme, to the determined sub-action for the frame, wherein the NFA scheme has a set of states associated with corresponding sub-actions and is configured to output one or more action classes;
      perform, using the NFA scheme, a state transition from a state associated with the sub-action to another state associated with another sub-action;
      determine, using the NFA scheme, an action class;
      detect the action based on the action class; and
      increment an action counter based on the detected action.

2. The electronic device according to claim 1, wherein the determination of the action class comprises a labelling of the frame with the action class.

3. The electronic device according to claim 1, wherein the processor circuitry is configured to initialize the NFA scheme.

4. The electronic device according to claim 1, wherein the machine-learning scheme is trained using a supervised scheme on the features for sub-action determination.

5. The electronic device according to claim 1, wherein the machine-learning scheme comprises a supervised machine learning scheme.

6. The electronic device according to claim 5, wherein the supervised machine learning scheme comprises one or more of:
   a Convolutional Neural Network;
   a Graph Convolutional Network;
   a random forest scheme;
   a gradient boosting scheme;
   linear models; and/or
   a Recurrent Neural Network.

7. The electronic device according to claim 1, wherein the processor circuitry is configured to repeat for each of a series of frames:
   the determination, based on the set of features associated with the frame, using the action detection model, of whether the frame corresponds to a sub-action, and
   the application of the NFA scheme to the determined sub-action for the frame.

8. The electronic device according to claim 1, wherein the determination of the sub-action is performed after expiry of a time period.

9. The electronic device according to claim 1, the electronic device comprising associated sensor circuitry configured to generate the sensor data.

10. The electronic device according to claim 1, wherein the electronic device is an electronic user device.

11. The electronic device according to claim 1, wherein the electronic device is a server device.

12. The electronic device according to claim 1, wherein the set of features associated with the frame is generated using a sliding window with a number of frames.

13. The electronic device according to claim 12, wherein the processor circuitry is configured to update the sliding window.

14. The electronic device according to claim 1, wherein the determining, based on the set of features associated with the frame, using the action detection model, whether the frame corresponds to the sub-action is based on a detection of a start of the sub-action or an end of the sub-action using the set and the action detection model.

15. A method, performed by an electronic device, for counting an action, wherein the action comprises one or more sub-actions, the method comprising:
    obtaining sensor data;
    generating, based on the sensor data, a set of features associated with a frame,
    determining, based on the set, using an action detection model, whether the frame corresponds to a sub-action, wherein determinations for a number of consecutive frames above a threshold number of consecutive frames as corresponding to the sub-action are performed before determining whether the frame corresponds to the sub-action, wherein the action detection model is based on a machine-learning scheme,
    applying a nondeterministic finite automaton, NFA, scheme to the determined sub-action for the frame, wherein the NFA scheme has a set of states associated with corresponding sub-actions and is configured to output one or more action classes;
    performing, using the NFA scheme, a state transition from a state associated with the sub-action to another state associated with another sub-action;
    determining, using the NFA scheme, an action class;
    detecting the action based on the action class; and
    incrementing an action counter based on the detected action.

16. The method according to claim 15, wherein determining of the action class comprises labelling of the frame with the action class.

17. The method according to claim 15, wherein the method comprises initializing the NFA scheme.

18. The method according to claim 16, wherein the method comprises training the machine-learning scheme using a supervised scheme on the features for sub-action determination.

19. The method according to claim 16, wherein the machine-learning scheme comprises a supervised machine learning scheme.

20. The electronic device according to claim 1, wherein the processor circuitry is configured to perform the determinations for a number of consecutive frames as corresponding to the sub-action above a threshold number of two or more consecutive frames before determining whether the frame corresponds to the sub-action.

21. The electronic device according to claim 20, wherein:
    the processor circuitry is configured to perform the determinations as predictions for the number of consecutive frames above the threshold number of two or more consecutive frames as corresponding to the sub-action before determining whether the frame corresponds to the sub-action.

22. The electronic device according to claim 1, wherein the processor circuitry is configured to perform the determinations for a number of consecutive frames as corresponding to the sub-action above a configurable threshold based on one or more of:
    a sampling rate;
    a false positive requirement; and/or
    a false negative requirement.

* * * * *